United States Patent
Fu et al.

(10) Patent No.: US 12,151,519 B2
(45) Date of Patent: Nov. 26, 2024

(54) TIRE PRESSURE MONITORING MODULE, TIRE LOCALIZATION SYSTEM AND TIRE LOCALIZATION METHOD

(71) Applicant: Nanjing Silergy Micro Technology Co., Ltd., Nanjing (CN)

(72) Inventors: Jiajie Fu, Nanjing (CN); Chunbo Lin, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 332 days.

(21) Appl. No.: 17/699,549

(22) Filed: Mar. 21, 2022

(65) Prior Publication Data

US 2022/0324272 A1    Oct. 13, 2022

(30) Foreign Application Priority Data

Mar. 30, 2021  (CN) .......................... 202110342835.5

(51) Int. Cl.
| | |
|---|---|
| *G01S 5/02* | (2010.01) |
| *B60C 23/04* | (2006.01) |
| *G01S 5/04* | (2006.01) |
| *G01S 5/14* | (2006.01) |
| *H04W 64/00* | (2009.01) |

(52) U.S. Cl.
CPC ...... *B60C 23/0416* (2013.01); *B60C 23/0444* (2013.01); *B60C 23/0452* (2013.01); *G01S 5/0269* (2020.05); *G01S 5/04* (2013.01); *G01S 5/14* (2013.01); *H04W 64/00* (2013.01)

(58) Field of Classification Search
CPC . G01S 5/0269; G01S 5/04; G01S 5/14; B60C 23/0416; B60C 23/0444; H04W 64/00
USPC .......................................................... 342/451
See application file for complete search history.

(56) References Cited

U.S. PATENT DOCUMENTS

| | | | |
|---|---|---|---|
| 6,166,698 | A | 12/2000 | Turnbull et al. |
| 7,224,267 | B1 | 5/2007 | Ellis |
| 8,095,333 | B2 | 1/2012 | Penot et al. |
| 8,421,612 | B2 | 4/2013 | Sugiura |
| 8,922,359 | B2 | 12/2014 | Lim |
| 9,420,408 | B2 | 8/2016 | Liu |
| 10,596,865 | B2 | 3/2020 | Patel et al. |
| 10,870,322 | B2 | 12/2020 | Liu |
| 10,894,450 | B2 | 1/2021 | Liu |
| 2009/0102636 | A1 | 4/2009 | Tranchina |
| 2011/0205047 | A1 | 8/2011 | Patel et al. |
| 2017/0282655 | A1 | 10/2017 | Liu et al. |

(Continued)

FOREIGN PATENT DOCUMENTS

| | | |
|---|---|---|
| CN | 102862450 A | 1/2013 |
| CN | 106347041 A | 1/2017 |
| CN | 110824418 A * | 2/2020 |

(Continued)

*Primary Examiner* — Harry K Liu

(57) ABSTRACT

A tire localization method for a vehicle, can include: matching a first Bluetooth module in each tire of the vehicle with a second Bluetooth module of a Bluetooth host in the vehicle; acquiring first data representing a received signal strength indication of a first radio frequency signal sent by the first Bluetooth module in each tire; acquiring an angle of arrival of the first Bluetooth module in each tire relative to the second Bluetooth module; and locating each tire based on the first data and the angle of arrival.

18 Claims, 5 Drawing Sheets

(56) References Cited

U.S. PATENT DOCUMENTS

2020/0250352 A1* 8/2020 Wodrich .................... G01S 5/14
2020/0384815 A1* 12/2020 Adler ...................... H04W 4/48

FOREIGN PATENT DOCUMENTS

| CN | 113147277 A | * | 7/2021 | ............. | B60C 23/04 |
| CN | 113923585 A | * | 1/2022 | | |
| FR | 3090488 B | | 6/2020 | | |
| WO | WO-2021023208 A1 | * | 2/2021 | ......... | G06F 3/04883 |

* cited by examiner

TIRE PRESSURE MONITORING MODULE, TIRE LOCALIZATION SYSTEM AND TIRE LOCALIZATION METHOD

RELATED APPLICATIONS

This application claims the benefit of Chinese Patent Application No. 202110342835.5, filed on Mar. 30, 2021, which is incorporated herein by reference in its entirety.

FIELD OF THE INVENTION

The present invention generally relates to the field of vehicle monitoring technology, and more particularly, to tire pressure monitoring modules, tire localization systems, and tire localization methods for vehicles.

BACKGROUND

In traditional tire pressure monitoring systems (TPMS), a one-to-one correspondence between the tire pressure monitoring module and the tire orientation may be preset before leaving the factory, which can result in inconvenience to the installation and debugging process. If the designated tire pressure monitoring module is accidentally not installed on a designated tire, the user will receive an incorrect tire pressure alarm signal, which increases safety hazards in long-distance road driving.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

At present, existing tire localization technologies mainly utilize the received signal strength indication (RSSI) of Bluetooth for distance measurement, and then perform rough distance localization calculation by substituting the measured distance information into the existing distance measurement model. Such tire localization technology may use a lot of Bluetooth anchor points, which can be insufficient in calculation speed, may have a large localization delay, can be easily affected by the environment, and may not be sufficiently accurate.

Figure 1:
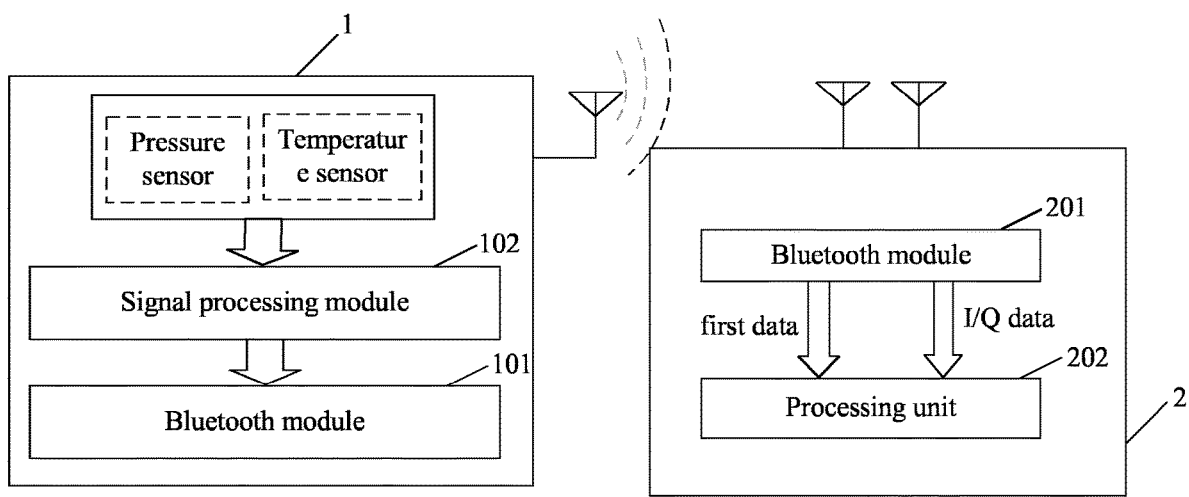
FIG. 1 is a schematic block diagram of an example tire localization system, in accordance with embodiments of the preset invention.

Referring now to FIG. 1, shown is a schematic block diagram of an example tire localization system, in accordance with embodiments of the preset invention. In this particular example, the tire localization system can include a plurality of tire pressure monitoring modules 1 and Bluetooth host 2. For example, tire pressure monitoring module 1 is installed on each tire. It should be understood that each tire pressure monitoring module 1 here can be installed on any tire without any distinction. As used herein, a "module" can include hardware circuitry. For example, tire pressure monitoring module 1 can include "first" Bluetooth module 101 and a plurality of sensors (e.g., a pressure sensor and a temperature sensor) for acquiring various parameters of the tire. Bluetooth module 101 can be utilized for information collection and forwarding, and may support Bluetooth 5.1 and above protocols. Bluetooth module 101 may have at least one antenna. Bluetooth host 2 can include "second" Bluetooth module 201 and processing unit 202. Bluetooth module 201 can wirelessly communicate with Bluetooth module 101, and processing unit 202 can achieve the localization of the tire in the vehicle according to RSSI of the first radio frequency (RF) signal sent by Bluetooth module 101 and the angle of arrival (AOA) of Bluetooth module 101 relative to Bluetooth module 201.

In particular embodiments, Bluetooth module 201 may have multiple antennas and can support Bluetooth 5.1 and above protocols. For example, the location where Bluetooth host 2 is installed may be close to the front of the vehicle or close to the rear of the vehicle. In another example, Bluetooth host 2 can be installed in a center console inside the vehicle. For example, Bluetooth module 201 may receive and parse a first RF signal sent by Bluetooth module 101 to obtain a first data representing the RSSI of the first RF signal. Processing unit 202 can determine the relative position of the corresponding tire by reading the first data representing the RSSI of the first RF signal sent by each "first" Bluetooth module 101 and parsed by "second" Bluetooth module 201. Since the distance between the installation position of Bluetooth module 201 and the front tires is different from the distance between the installation position of Bluetooth module 201 and the rear tires, the front and rear tires can be determined accordingly. It should be understood that any suitable approach for obtaining the RSSI in the can be utilized in certain embodiments.

In Bluetooth 5.1 and above protocols, a direction finding mechanism has been introduced into the protocol. Bluetooth module 201 may have at least two antennas and can receive the RF signal sent by Bluetooth module 101 in a time-sharing manner according to certain rules. The same RF signal received by different antennas can have a phase difference, and then the AOA of Bluetooth module 101 relative to Bluetooth module 201 can be obtained according to the phase difference, in order to determine the orientation of Bluetooth module 101.

For the tire localization system, since it may only be necessary to obtain the orientation of tire pressure monitoring module 101 without inferring specific location information, in order to reduce costs, particular embodiments may only utilize Bluetooth module with two antennas, for example. It should be understood that the second Bluetooth module with a multi-antenna array can also be utilized in certain embodiments. Further, according to the Bluetooth 5.1 protocol specification, Bluetooth module 201 may utilized two antennas alternately to receive the second RF signal sent by the first Bluetooth module in the I/Q sampling mode, where the second RF signal can include a field for calculating the AOA. Processing unit 202 can calculate the phase difference between the second RF signal reaching the two antennas according to the I/Q data, and may obtain the AOA of Bluetooth module 101 relative to Bluetooth module 201 according to the phase difference between the second RF signal reaching the two antennas, and can determine the left and right position of the tire according to each AOA.

In particular embodiments, the process of acquiring I/Q data according to the second RF signal may be performed by processing unit 202. It should be understood that in other examples, Bluetooth module 201 may also include a simple processing module to obtain I/Q data according to the second RF signal. In particular embodiments, processing unit 202 can execute the corresponding localization program according to the first data representing the RSSI acquired by Bluetooth module 201, in order to realize the localization of the front and rear tires. In addition, processing unit 202 may obtain I/Q data according to the second RF signal received by Bluetooth module 201, and can execute the corresponding localization program to realize the localization of the left and right tires, thereby completing the localization of each tire.

After tire localization is completed, multiple sensors including pressure and temperature sensors in tire pressure monitoring module 1 can collect parameter information (e.g., pressure and temperature) of each tire and transmit it to Bluetooth module 101. Tire pressure monitoring module 1 may also include signal processing module 102. After each parameter information is processed by signal processing module 102 (e.g., shaping, amplifying, and analog-to-digital conversion, etc.), the second data representing the parameter information (e.g., pressure, temperature, etc.) of each tire can be transmitted to Bluetooth module 101, and then Bluetooth module 101 may send it to Bluetooth module 201 in a wireless manner.

It should be noted that wireless communication can be performed between Bluetooth modules 101 and 201 through Bluetooth, in order to realize the sending and receiving of information. Bluetooth module 201 can simultaneously receive the data sent by a plurality of the first Bluetooth modules when there is no connection (e.g., first and second Bluetooth modules have not established a connection) through broadcasting. Alternatively, Bluetooth module 201 may establish a connection with one of a plurality of the first Bluetooth modules in a connection-oriented manner, in order to receive the data sent by the one of a plurality of the first Bluetooth modules. In particular embodiments, Bluetooth module 101 may send an RF signal to Bluetooth module 201 in any one of broadcast or connection-oriented manners. In some examples, the first and second RF signals can be received by Bluetooth module 201 in a connection-oriented manner to ensure data stability. In addition, the second data representing temperature and pressure can be received by Bluetooth module 201 by broadcasting, in order to reduce the power consumption of system.

Figure 2:
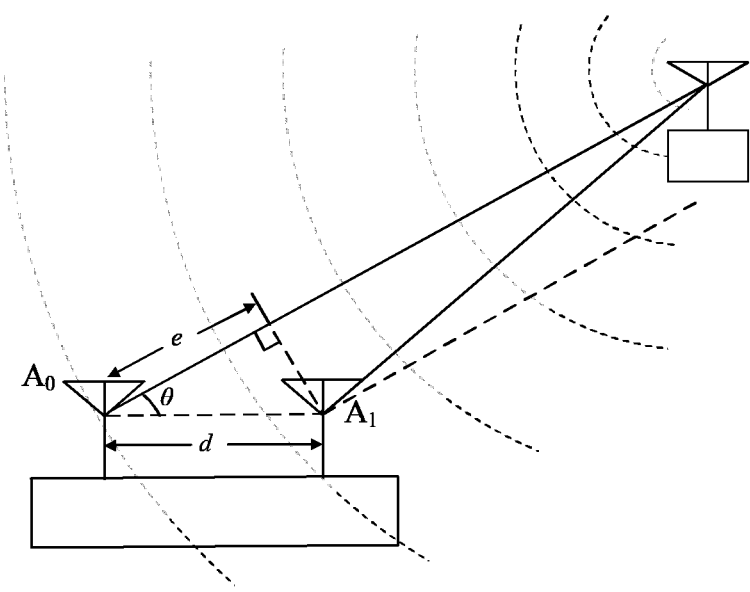
FIG. 2 is a schematic block diagram of AOA estimation, in accordance with embodiments of the present invention.

Referring now to FIG. 2, shown is a schematic block diagram of AOA estimation, in accordance with embodiments of the present invention. In this particular example, the straight line formed by two antennas A0 and A1 of Bluetooth module 201 is parallel to the transverse direction of the front of the vehicle, and the two antennas are placed at distance d from left to right. In the I/Q sampling mode, the two antennas A0 and A1 are continuously switched in the switching mode specified by Bluetooth host 2 to receive the second RF signal (shown as plane waves parallel to each other in FIG. 2) sent from each Bluetooth module 101. Bluetooth module 201 can start I/Q sampling according to the instruction of Bluetooth host 2, and may sequentially receive the second RF signal sent by Bluetooth module 101 in each tire. When one of the antennas is in the sampling period, the received second RF signal may remain unchanged, and can be passed to processing unit 202 to obtain the I/Q data collected by the antenna. Also, data I can be obtained by performing ADC sampling and filtering processing on the I/Q data. At the same time, processing unit 202 may shift the phase angle of data I ahead by 90° to obtain data Q, as shown in the following Formula (1):

$$\begin{cases} I = A\cos(\varphi_0) \\ Q = A\cos\left(\varphi_0 - \frac{\pi}{2}\right) = A\sin(\varphi_0) \end{cases} \Rightarrow \varphi_0 = \arctan\frac{Q}{I} \qquad (1)$$

Here, $\varphi_0$ is the phase angle of the received signal at any time, and $A\cos(\varphi_0)$ is the transmitted AOA wireless signal. By switching the two antennas to obtain the I/Q data, the phase difference $\varphi_{diff}$ of the AOA wireless signals received by the two antennas A0 and A1 can be calculated as shown in the following Formula (2):

$$\varphi_{diff} = \arctan\left(\frac{Q_1}{I_1}\right) - \arctan\left(\frac{Q_2}{I_2}\right) \qquad (2)$$

Here, I1 and Q1 are I/Q data collected by the first antenna of the second Bluetooth module, and I2 and Q2 are I/Q data collected by the second antenna of the second Bluetooth module. In order to further reduce the complexity of data processing, Formula (2) can be simplified as shown in the following Formula (3):

$$\varphi_{diff} = \arctan\left(\frac{I_2 \cdot Q_2 - I_1 \cdot Q_2}{I_1 \cdot I_2 + Q_1 \cdot Q_2}\right) \qquad (3)$$

The angle of arrival θ can thus be obtained as shown in the following Formula (4):

$$\theta = \arccos\frac{\varphi_{diff} \times \lambda}{2\pi d} \qquad (4)$$

Here, d is the distance between antennas A0 and A1 and d≤λ/2, λ is the wavelength of the second RF signal, such that the AOA or θ in the formula can be obtained. Further, in order to ensure the accuracy of the data, the I/Q data can be sampled multiple times to repeatedly calculate the AOA, and the final value of AOA can be obtained through filtering processing. For example, the process of acquiring the I/Q data according to the second RF signal can be performed by processing unit 202. In other examples Bluetooth module 201 may also include a simple processing module to obtain the I/Q data according to the second RF signal.

Figure 3:
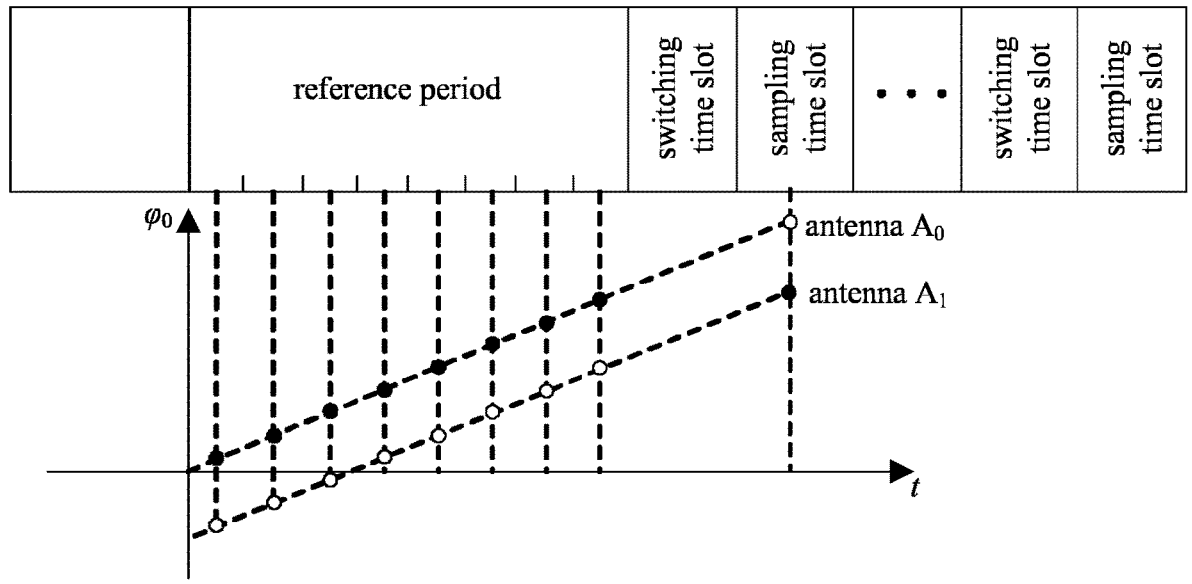
FIG. 3 is a schematic block diagram of an antenna switching mode in an I/Q sampling process, in accordance with embodiments of the present invention.

Referring now to FIG. 3, shown is a schematic block diagram of an antenna switching mode in an I/Q sampling process, in accordance with embodiments of the present invention. In this particular example, the ordinate is the phase angle of the second RF signal received by the antenna at the corresponding moment, where the solid circles represent sampling points, and the hollow circles represent un-sampling points. In the Bluetooth 5.1 protocol, a CTE field is added after the CRC field of the data packet for I/Q sampling, and FIG. 3 shows the CTE field. Antenna A0 may first receive the BLE data packet. After receiving the CRC field, antenna A0 can wait for a guard period (e.g., 4 μs), and then may sample 8 I/Q data at a frequency of 1 μs within the reference period (e.g., 8 μs). Then, during the switching time slot (e.g., 2 μs) antenna A1 being switched from antenna A0 can sample a set of I/Q data in the sampling time slot (e.g., 2 μs). After that, antenna A0 can be switched from antenna A1 during the switching time slot, and antenna A0 can sample at the sampling time slot, and repeat the above operation by switching continuously.

During the I/Q sampling process, the two antennas may not receive the second RF signal at the same time, but can have a switching time slot, so there can be an error in the calculated phase difference $\varphi_{diff}$. In order to ensure the accuracy of the AOA, when one of the antennas is in the sampling time slot, the sampling value of the other antenna in the current sampling time slot may need to be estimated by an algorithm. It can be assumed that the orientation of Bluetooth module 101 relative to the Bluetooth host may remain unchanged for a certain period; that is, the second RF signal received by Bluetooth module 201 from Bluetooth module 101 may also remain unchanged for a certain period. It can be seen from FIG. 3 that phase angle $\varphi_0$ of the second RF signal collected by the two antennas is a linear sequence in the time series, so it can be considered that angle of arrival θ of Bluetooth module 101 relative to the Bluetooth host remains unchanged in a relatively short period of time. Therefore, the Kalman filtering algorithm can be used to estimate angle of arrival θ of the first Bluetooth module in real time. Let the estimated angle of arrival θ(k) be state quantity X(k) of the filter, and phase difference $\varphi_{diff}(k)$ calculated from the real-time sampling data be observation quantity Z(k), then the Kalman filter state equation and observation equation can be constructed as shown in the following Formula (5):

$$\begin{cases} X(k+1) = f[k, X(k)] + w(k) \\ Z(k) = h[k, X(k)] + v(k) \end{cases} \Rightarrow \begin{cases} \theta(k+1) = \theta(k) + w(k) \\ \varphi_{diff}(k) = \pi \cdot \cos[\theta(k)] + v(k) \end{cases} \quad (5)$$

Here, k is the discrete time, θ(k) is the angle of arrival of the system at time k, $\varphi_{diff}(k)$ is the corresponding phase difference observation value at time k, and w(k) and v(k) are Gaussian white noise with mean 0, variance Q and R, respectively, and independent of each other. The Kalman filter can make an optimal estimation of the target state based on the minimum mean square error criterion under the condition of a linear Gaussian model. However, in the Kalman filter constructed by Formula (5), the observation equation contains nonlinear factors, and the Kalman filter algorithm may not achieve optimal estimation. In order to estimate the state of the system more accurately, the Extended Kalman Filter (EKF) algorithm with less computational complexity can be used without changing the Kalman filter framework to convert the nonlinear filtering into a linear filtering. The first-order Taylor expansion of $\varphi_{diff}(k)$ in the observation equation can be used to obtain the following Formula (6):

$$\varphi_{diff}(k) = H(k) \times \theta(k) + y(k) \times v(k) \quad (6)$$

Here, H(k) is the observation matrix, and y(k) is the non-random external action term. After that, state observation can be performed to obtain angle of arrival θ. In particular embodiments, the state equation and the observation equation of the Kalman filter are constructed for angle of arrival θ and phase difference $\varphi_{diff}$, and the observation equation is linearized, in order to obtain a more accurate angle of arrival θ. It should be understood that the above method of constructing a Kalman filter to filter the angle of arrival is only one of the filtering methods, and other filter approaches may also be used to filter the AOA in certain embodiments.

Figure 4:
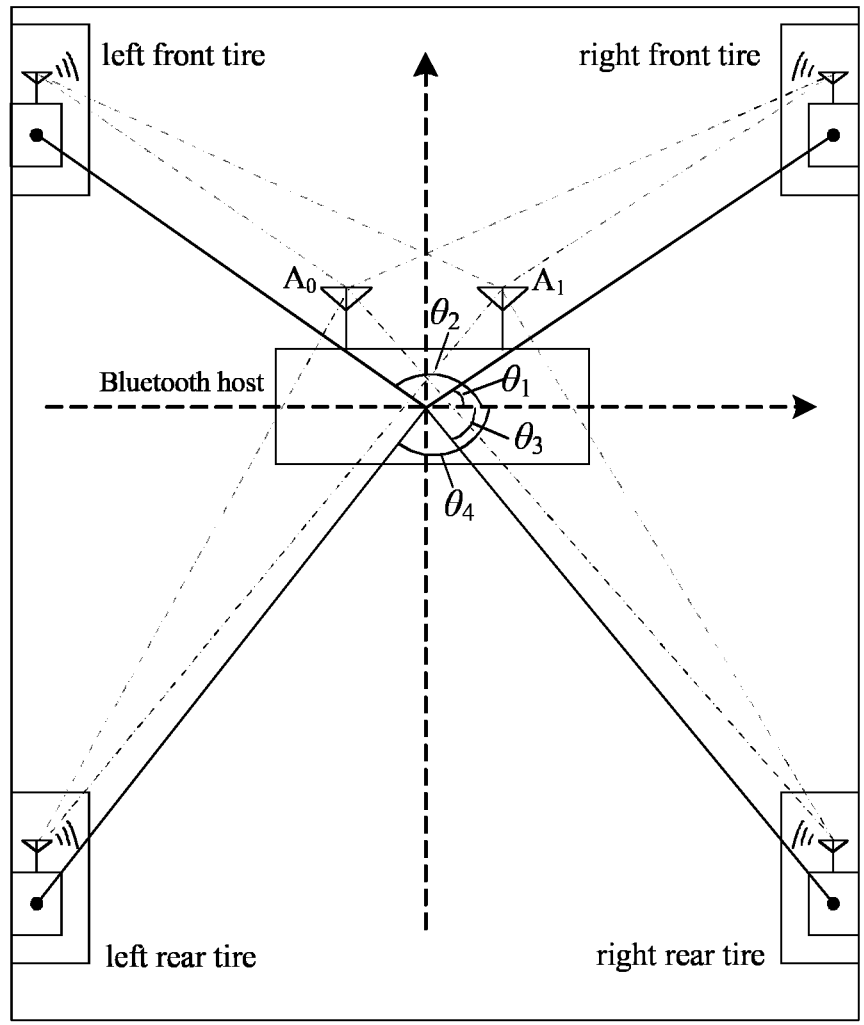
FIG. 4 is a schematic block diagram of determining the left and right position of a tire using AOA, in accordance with embodiments of the present invention.

Referring now to FIG. 4, shown is a schematic block diagram of determining the left and right position of a tire using AOA, in accordance with embodiments of the present invention. In this particular example, Bluetooth host 2 can be placed on the center console of the car as an example for description. It should be understood that angle of arrival θ is the angle between the straight line from the first Bluetooth module to the second Bluetooth module in Bluetooth host 2 and the straight line formed by the two antennas of the second Bluetooth module. This example, the angle of arrival of the first Bluetooth module in the right front tire relative to the second Bluetooth module is $\theta_1$, the angle of arrival of the first Bluetooth module in the left front tire relative to the second Bluetooth module is $\theta_2$, $\theta_1$ is less than 90°, and $\theta_2$ is greater than 90°. The angles of arrival of the first Bluetooth modules in the left front tire and right front tire relative to the second Bluetooth module are positive values, and the angles of arrival of the first Bluetooth modules in the left rear tire and right rear tire relative to the second Bluetooth module are negative values.

Correspondingly, the angle of arrival of the first Bluetooth module in the right rear tire relative to the second Bluetooth module is $\theta_3$, and its absolute value is less than 90°. Further, the angle of arrival of the first Bluetooth module in the left rear tire relative to the second Bluetooth module is $\theta_4$, and its absolute value is greater than 90°. That is, the angles of arrival corresponding to the right tires are smaller than the angles of arrival corresponding to the left tires. For example, the angles of arrival corresponding to the two tires on the right side are less than 90°, while the angles of arrival corresponding to the two tires on the left side are greater than 90°. Therefore, it can be determined whether the tire belongs to the left tire group or the right tire group according to the absolute value of the angle of arrival of the first Bluetooth module in each tire relative to the second Bluetooth module.

In particular embodiments, the first Bluetooth module in each tire can send the first RF signal to the second Bluetooth module in the Bluetooth host, respectively. It should be understood that the first RF signal may be an RF signal containing any data, and may also be a broadcast signal sent by the first Bluetooth module in the initial stage when the broadcast transmission mode is enabled. The second Bluetooth module can receive and parse the RSSI of the first RF signal sent by the first Bluetooth module. In particular embodiments, since the Bluetooth host is set on the center console (e.g., close to the front tires), the RSSIs of the first RF signals sent by the first Bluetooth modules in the two front tires are greater than the RSSIs of the first RF signals sent by the first Bluetooth modules in the two rear tires, such that the processing unit can determine whether the tire belongs to the front tires or the rear tires according to the obtained RSSI.

For example, Bluetooth module 201 in the Bluetooth host may respectively receive the first RF signals sent by each of the first Bluetooth modules and parse them to obtain first data representing the RSSI of the first RF signal. Processing unit 202 may respectively read the first data relative to the four tires and convert them into RSSIs, and then may sort them. The tires corresponding to the two larger RSSIs belong to the front tire group, and the tires corresponding to the two smaller RSSIs belong to the rear tire group.

In particular embodiments, processing unit 202 may first determine the front and rear positions of the tires according to the plurality of first data representing the RSSIs of the first RF signals sent by each of first Bluetooth modules, and then can determine the left and right positions of the tires by comparing the AOAs of the first Bluetooth modules in the front or rear tire group relative to the second Bluetooth module. For example, processing unit 202 may first sort the obtained multiple first data representing the RSSIs of the first RF signals. Among the multiple first data, it can be determined that the two tires corresponding to the two larger first data belong to the front tire group, and the two tires corresponding to the two smaller first data belong to the rear tire group. Then, in the front or rear tire group, the tire corresponding to the AOA with the larger absolute value is the left tire, and the tire corresponding to the AOA with the smaller absolute value is the right tire, thereby completing all tire positioning.

In another embodiment, processing unit 202 may first determine the left and right positions of the tires according to AOAs of the first Bluetooth modules in the tires relative to the second Bluetooth module, and then can determine the front and rear positions of the tires according to the plurality of first data representing the RSSIs of the first RF signals sent by first Bluetooth modules in the left and right tire group. For example, each tire with the absolute value of the AOA being greater than 90° belongs to the left tire group, and each tire with the absolute value of the AOA being less than 90° belongs to the right tire group. Then, in the right or left tire group, the tire corresponding to the larger RSSI is the front tire, and the tire corresponding to the smaller RSSI is the rear tire, for example.

It should be understood that the two antennas of the Bluetooth host can also be placed vertically; that is, the straight line formed by the two antennas is parallel to the longitudinal direction of the vehicle body. In this way, the AOAs of the first Bluetooth modules in the right tires relative to the second Bluetooth module are positive value, and the AOAs of the first Bluetooth modules in the left tires relative to the second Bluetooth module are negative value. The left and right tires can also be determined by the positive or negative value of the AOA.

Figure 5:
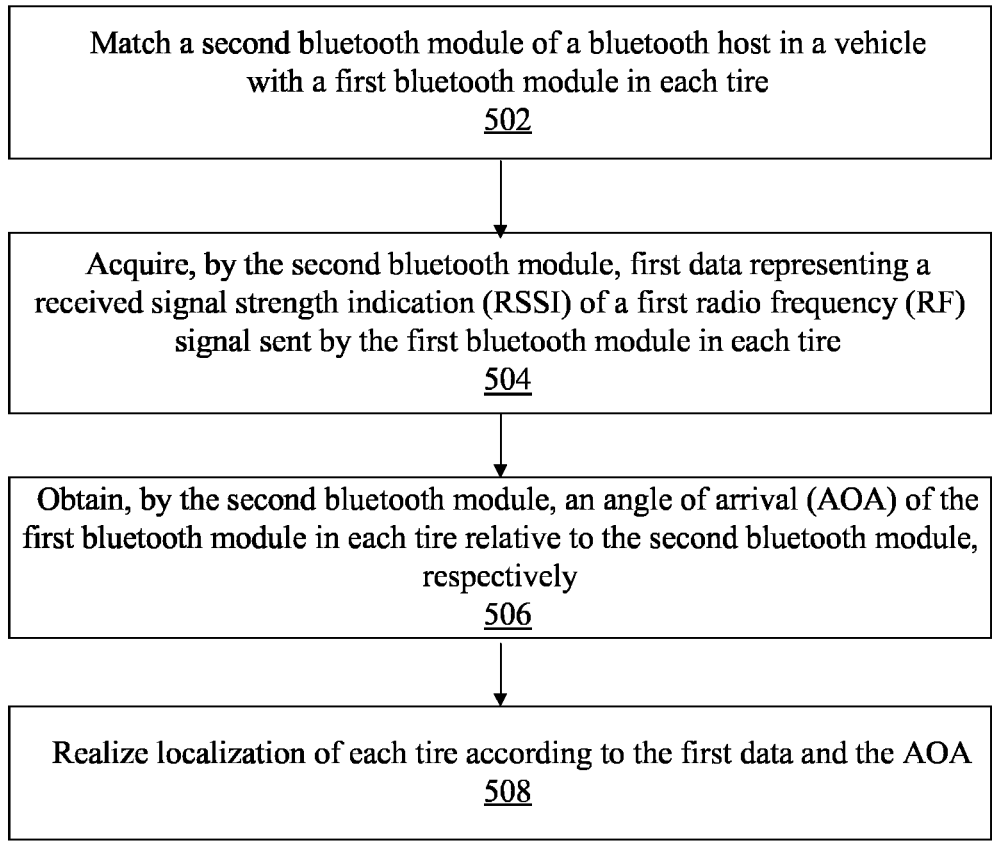
FIG. 5 is a flow diagram of an example tire localization method, in accordance with embodiments of the present invention.

Referring now to FIG. 5, shown is a flow diagram of an example tire localization method, in accordance with embodiments of the present invention. At 502, the second Bluetooth module of the Bluetooth host in the vehicle can be matched with the first Bluetooth module in each tire. For example, the first Bluetooth module may turn on o the broadcast transmission mode, and the broadcast signal can include its own MAC address and an ID indicating product information. Secondly, the Bluetooth host may turn on the scanning mode, and can receive and analyze the broadcast signal sent by the first Bluetooth module. Then, it can be determined whether it is the target device according to the MAC address and the ID in the broadcast signal. If so, the Bluetooth host may record the MAC address and the ID in the broadcast signal. The matching may not be completed until the Bluetooth host records all the broadcast signals sent from the first Bluetooth modules of the four tires.

At 504, the second Bluetooth module may respectively acquire first data representing the RSSI of the first RF signal sent by the first Bluetooth module in each tire. In some examples, the second Bluetooth module may obtain the first data representing the RSSIs from the broadcast signals sent by the first Bluetooth module in each tire, respectively. In other examples, the second Bluetooth module may also acquire the first data representing RSSIs from other RF signals sent by the first Bluetooth modules.

At 506, the second Bluetooth module may obtain the AOA of the first Bluetooth module in each tire relative to the second Bluetooth module, respectively. For example, the first Bluetooth module may sequentially receive instructions to start sending a second RF signal, where the second RF signal can include a field for calculating AOA. The second Bluetooth module may alternately use two antennas to receive the second RF signal, and can perform I/Q sampling on the field used for calculating AOA in the second RF signal to obtain I/Q data. In addition, the AOAs of the first Bluetooth modules relative to the second Bluetooth module can be calculated according to the I/Q data.

It should be understood that, the processing unit in the Bluetooth host may acquire I/Q data according to the second RF signal received by the second Bluetooth module, and filter the I/Q data to filter out abnormal values. In addition, the AOA can be calculated repeatedly, and a relatively stable result may be obtained through the mean value processing to ensure the accuracy of the AOA calculation. In particular embodiments, the processing unit may utilize the calculated phase difference of the second RF signal reaching the two antennas as the observation quantity, and the AOA as the state quantity to construct the state equation and the observation equation of the Kalman filter. The observation equation can be linearized to obtain a more accurate AOA.

At 508, the localization of each tire can be realized according to the first data and the AOA. For example, taking the AOA and the first data as input parameters, the processing unit may determine the orientation of the corresponding first Bluetooth module by executing a corresponding positioning program. The localization of the front and rear tires can be completed according to the first data representing the RSSIs of the first RF signals, and the localization of the left and right tires may be completed according to the AOA of each first Bluetooth module relative to the second Bluetooth module.

It should be understood that the sequence of acquiring the first data representing the RSSI of the first RF signal and the AOA is not limited to this particular example, and there is no sequence limitation on whether to perform the localization of the left and right tires or the front and rear tires first. The second Bluetooth module can receive and analyze any RF signal sent by the first Bluetooth module to obtain the first data representing RSSI, and the AOA can be calculated according to the second RF signal sent by the first Bluetooth module only when the Bluetooth host initiates a command. Therefore, before the I/Q sampling is started, the second Bluetooth module can first obtain the first data representing the RSSI, and at this time, the processing unit may start to execute the front and rear tires positioning program. When the first Bluetooth module sends the first RF signal, the processing unit can begin to determine the left and right tires. If the second RF signal is sent at the beginning, the processing unit in the Bluetooth host can also first calculate the AOA according to the obtained I/Q data, in order to determine the left and right tires. Then, the front and rear tires can be determined according to the obtained first data representing the first RF signal.

Once each tire has been accurately positioned, then the Bluetooth host may instruct all the first Bluetooth modules to stop sending the second RF signal by broadcasting, and stop the I/Q data sampling. That is, after the localization of each tire is completed, the I/Q sampling process may not need to be initiated again. After that, each first Bluetooth module can transmit real-time data such as temperature and pressure collected by each sensor to the Bluetooth host through broadcasting. In the broadcast mode, each first Bluetooth module can send the temperature, pressure, and other data of the corresponding tire to the second Bluetooth module at any time, such that the Bluetooth host can determine which tire has abnormal information to subsequently be addressed.

In particular embodiments, front and rear positioning of the tires can be realized by utilizing the RSSIs of the first RF signals sent by the first Bluetooth modules in the tire pressure monitoring modules of tires. Also, the left and right positioning of the tires can be realized by utilizing the AOAs of the first Bluetooth modules in the tire pressure monitoring modules relative to the multi-antenna Bluetooth host, in order to achieve high-precision automatic localization of the tires in the vehicle. In addition, each tire pressure monitoring module can be installed on any tire without any distinction, thereby reducing installation costs.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A tire localization method for a vehicle, the method comprising:
   a) matching a first Bluetooth module in each tire of the vehicle with a second Bluetooth module of a Bluetooth host in the vehicle;
   b) acquiring first data representing a received signal strength indication of a first radio frequency signal sent by the first Bluetooth module in each tire;
   c) acquiring an angle of arrival of the first Bluetooth module in each tire relative to the second Bluetooth module;
   d) locating each tire based on the first data and the angle of arrival;
   e) sorting the first data corresponding to each tire;
   f) determining whether a tire belongs to a front tire group or a rear tire group by determining tires corresponding to two larger first data and two smaller first data, respectively; and
   g) determining whether a tire is a left tire or a right tire by comparing the angle of arrival of the first Bluetooth module relative to the second Bluetooth module in the front tire group or the rear tire group.

2. The method of claim 1, further comprising determining whether a tire is a front tire or a rear tire according to the first data corresponding to each tire.

3. The method of claim 1, further comprising determining whether a tire is a left tire or a right tire according to the angle of arrival of the first Bluetooth module in each tire relative to the second Bluetooth module.

4. The method of claim 1, further comprising:
   a) receiving an instruction, by the first Bluetooth module, to send a second radio frequency signal, wherein the second radio frequency signal comprises a field for calculating the angle of arrival;
   b) alternately using two antennas of the second Bluetooth module to receive the second radio frequency signal;
   c) sampling the field for calculate the angle of arrival in the second radio frequency signal to obtain I/Q data; and
   d) calculating the angle of arrival of the first Bluetooth module relative to the second Bluetooth module according to the I/Q data.

5. The method of claim 4, further comprising constructing a state equation and an observation equation of a Kalman filter, in order to obtain an accurate angle of arrival, wherein a calculated phase difference of the second radio frequency signal reaching the two antennas is configured as an observation quantity, and the angle of arrival is configured as a state quantity.

6. The method of claim 1, wherein when the second Bluetooth module is placed closer to the front tire group than the rear tire group the method further comprises:
   a) determining that two tires corresponding to the two larger first data belong to the front tire group; and
   b) determining that two tires corresponding to the two smaller first data belong to the rear tire group.

7. The method of claim 1, wherein when the second Bluetooth module is placed closer to the rear tire group than the front tire group, the method further comprises:
   a) determining that two tires corresponding to the two larger first data belong to the rear tire group; and
   b) determining that two tires corresponding to the two smaller first data belong to the front tire group.

8. The method of claim 6, wherein when a straight line formed by two antennas of the second Bluetooth module is perpendicular to a longitudinal direction of a body of the vehicle, the method further comprises:
   a) among two angles of arrival corresponding to the rear tire group or the front tire group, determining that the tire corresponding to an angle of arrival with a larger absolute value is the left tire; and
   b) determining that the tire corresponding to an angle of arrival with a smaller absolute value is the right tire.

9. The method of claim 6, wherein when a straight line formed by two antennas of the second Bluetooth module is parallel to a longitudinal direction of a body of the vehicle, the method further comprises:
   a) among two angles of arrival corresponding to the rear tire group or the front tire group, determining that the tire corresponding to a positive angle of arrival is the right tire; and
   b) determining that the tire corresponding to a negative angle of arrival is the left tire.

10. A tire localization method for a vehicle, the method comprising:
    a) matching a first Bluetooth module in each tire of the vehicle with a second Bluetooth module of a Bluetooth host in the vehicle;
    b) acquiring first data representing a received signal strength indication of a first radio frequency signal sent by the first Bluetooth module in each tire;
    c) acquiring an angle of arrival of the first Bluetooth module in each tire relative to the second Bluetooth module;
    d) locating each tire based on the first data and the angle of arrival;

e) determining whether a tire belongs to a left tire group or a right tire group according to the angle of arrival of the first Bluetooth module in each tire relative to the second Bluetooth module; and f) determining whether a tire is a front tire or a rear tire by comparing the first data representing the received signal strength indications of the first radio frequency signals sent by the first Bluetooth modules of two tires in the left tire group or the right tire group.

11. The method of claim 10, wherein when a straight line formed by two antennas of the second Bluetooth module is perpendicular to a longitudinal direction of a body of the vehicle, the method further comprises:

a) determining that the corresponding tire belongs to the right tire group when an absolute value of the angle of arrival is less than 90°; and b) determining that the corresponding tire belongs to the left tire group when the absolute value of the angle of arrival is greater than 90°.

12. The method of claim 10, wherein when a straight line formed by two antennas of the second Bluetooth module is parallel to a longitudinal direction of a body of the vehicle, the method further comprises:

a) determining that the corresponding tire belongs to the left tire group when the angle of arrival is a negative value; and b) determining that the corresponding tire belongs to the right tire group when the angle of arrival is a positive value.

13. The method of claim 11, wherein when the second Bluetooth module is placed closer to a front tire group than a rear tire group, the method further comprises:

a) among two first data corresponding to the right tire group or the left tire group, determining that the tire corresponding to a greater first data is the front tire; and b) determining that the tire corresponding to a lesser first data is the rear tire.

14. The method of claim 11, wherein when the second Bluetooth module is placed closer to a rear tire group than a front tire group, the method further comprises:

a) among two first data corresponding to the right tire group or the left tire group, determining that the tire corresponding to a larger first data is the rear tire; and b) determining that the tire corresponding to a smaller first data is the front tire.

15. A tire pressure monitoring apparatus installed in each tire of a vehicle, the apparatus comprising:

a) a first Bluetooth module configured to communicate with a second Bluetooth module of a Bluetooth host in the vehicle;

b) wherein localization of tires in the vehicle are realized according to an angle of arrival of the first Bluetooth module in each tire relative to the second Bluetooth module and first data representing a received signal strength indication of a first radio frequency signal sent by the first Bluetooth module in each tire;

c) wherein the first Bluetooth module has at least one antenna and supports Bluetooth 5.1 and above protocols;

d) sorting the first data corresponding to each tire;

e) determining whether a tire belongs to a front tire group or a rear tire group by determining tires corresponding to two larger first data and two smaller first data, respectively; and f) determining whether a tire is a left tire or a right tire by comparing the angle of arrival of the first Bluetooth module relative to the second Bluetooth module in the front tire group or the rear tire group.

16. The apparatus of claim 15, wherein the determination of whether a tire is a front tire or a rear tire is made according to the received signal strength indication of the first radio frequency signal sent by each first Bluetooth module.

17. The apparatus of claim 15, wherein the first Bluetooth module is configured to transmit a second radio frequency signal, and the second radio frequency signal comprises a field for calculating the angle of arrival.

18. A tire localization system for the vehicle, comprising a plurality of tire pressure monitoring modules of claim 15, respectively mounted on tires of the vehicle, the system comprising:

a) wherein the second Bluetooth module having at least two antennas and supporting Bluetooth 5.1 and above protocols; and b) a processing unit configured to determine the localization of tires in the vehicle according to the first data and the angle of arrival.

* * * * *